US010987796B2

United States Patent
Fox

(10) Patent No.: US 10,987,796 B2
(45) Date of Patent: Apr. 27, 2021

(54) ENGINE STAND

(71) Applicant: VIS, LLC, Travelers Rest, SC (US)

(72) Inventor: Robert Fox, Greenville, SC (US)

(73) Assignee: VIS, LLC, Travelers Rest, SC (US)

( * ) Notice: Subject to any disclaimer, the term of this patent is extended or adjusted under 35 U.S.C. 154(b) by 40 days.

(21) Appl. No.: 16/502,187

(22) Filed: Jul. 3, 2019

(65) Prior Publication Data

US 2021/0001470 A1    Jan. 7, 2021

(51) Int. Cl.
*F16M 11/00*    (2006.01)
*B25H 1/00*    (2006.01)
*F16M 11/04*    (2006.01)
*F16M 11/42*    (2006.01)
*B66C 23/48*    (2006.01)

(52) U.S. Cl.
CPC ........... *B25H 1/0007* (2013.01); *F16M 11/04* (2013.01); *F16M 11/42* (2013.01); *B66C 23/485* (2013.01)

(58) Field of Classification Search
CPC ........ B66C 23/00; B66C 23/48; F16M 13/00; F16M 11/04; F16M 11/42
See application file for complete search history.

(56) References Cited

U.S. PATENT DOCUMENTS

| | | | | |
|---|---|---|---|---|
| 3,218,056 A | * | 11/1965 | Kaplan | B25H 1/0007 269/61 |
| 3,381,953 A | * | 5/1968 | Miller | B60P 3/00 269/17 |
| 4,533,127 A | | 8/1985 | Hawkins | |
| 5,863,034 A | * | 1/1999 | Vauter | B23K 37/04 269/17 |
| 6,318,699 B1 | * | 11/2001 | Williams | B25H 1/0007 248/129 |
| 6,431,535 B1 | * | 8/2002 | Volpe | B25H 1/0007 269/47 |
| 6,491,293 B1 | * | 12/2002 | Brewer | B25B 11/02 269/17 |
| 6,581,920 B1 | * | 6/2003 | Smith | B25H 1/0007 254/134 |
| 10,487,975 B2 | * | 11/2019 | Smith | F16M 11/18 |

* cited by examiner

*Primary Examiner* — Amy J. Sterling
(74) *Attorney, Agent, or Firm* — J. Bennett Mullinax, LLC

(57) ABSTRACT

A wheeled engine stand and a process of using the engine stand is provided. The engine stand provides a wheeled base supporting a mounting head with retainers. The mounting head is reversibly attached to a drive shaft through, a retaining pin extending through a mounting head collar. A steering handle is detachably supported on an upper adaptor plate to allow for movement for the wheeled base.

2 Claims, 4 Drawing Sheets

ENGINE STAND

FIELD OF THE INVENTION

This invention is directed towards a geared engine stand that offers improvements in mobility, utility, and provides for an engine mounting head that is detachable from a drive shaft. The detachable mounting head allows for easier installation of the mounting head onto an engine. Following mounting of the mounting head, the engine stand is then reconnected.

BACKGROUND OF THE INVENTION

It is known in the art to provide engine stands that can be used to attach to an engine and move the engine within the confines of a repair shop. A common characteristic of an engine stand is that they employ some form of a rotating method to allow the rotation of an attached engine. Frequently, the rotation occurs in six equal increments and is controlled by a mounting plate tube that is activated by a handle connected to an opposite end of the tube. When the mounting plate tube is locked into position, the handle can be used to steer and maneuver the engine stand.

It is further known that the mounting head can be removed from the engine stand and mounted on the engine. Hereafter, the upright tube of the engine stand can be installed on the mounting tube head, locked in position, and then the loaded engine stand can be self-standing to support the engine. One such design known in the art is set forth in U.S. Pat. No. 4,533,127 entitled "Wheeled Stand", and which is incorporated herein by reference.

An additional variation on an engine stand design uses a rotating method that is controlled by, a worm gear driven gear box which is mounted on top of the upright where the gear shaft turns the mounting head. The gear box can be controlled manually or, in some variations as set forth in U.S. Pat. No. 6,318,699 and which is incorporated herein by reference, can utilize an electric motor to engage and disengage the worm gear.

In manual versions, the worm gear box is activated by a crank handle. The mounting head is stopped and locked in position when the crank handle is not activated. While a worm gear construction provides easier and better control of the mounting head rotation, there is no ability to remove the mounting head to mount it to the engine. Additionally, the crank handle used for rotating the mounting head can not be used for steering and maneuvering the engine stand. Merely adding a steering handle to an existing worm gear driven engine stand could prevent the crank handle rotation or interfere with other operations of the engine stand design. Accordingly, there is room for variation and improvement within the art.

SUMMARY OF THE INVENTION

It is at least one aspect of one embodiment of the present invention to provide for a steering handle for a worm gear engine stand that can be easily and quickly removed and installed and will not interfere with the operation of the crank handle, the crank handle being used to engage and disengage the worm drive of the engine stand.

It is a further aspect of at least one embodiment of the present invention to provide for a steering handle that is easily and quickly removed from a work position that is elevated above the worm drive gear and the drive shaft.

It is a further aspect of at least one embodiment of the present invention to provide for an adaptor plate positioned along one side of a gear housing, the adaptor, plate defining a plurality of slots for engaging a removeable handle, the slots further adapted for engaging a removeable work tray when the handle is not present.

It is a further aspect of at least one embodiment of the present invention to provide for a mounting head collar which is defined between a mounting head and the drive shaft, the mounting head collar further engaging a quick release detent pin for separating the mounting head and the mounting head collar from the drive shaft.

It is a further aspect of at least one embodiment of the present invention to provide an engine stand comprising:
  a wheeled base;
  a vertical upright attached to the wheeled base;
  a mounting head having a plurality of retainers, the mounting head and retainers adapted for attaching to an engine;
  the mounting head further defining a mounting head collar for receiving within the collar a drive shaft, the drive shaft and mounting head cantilevered outwardly over the wheeled base;
  a steering handle detachably supported by an adaptor plate, an adaptor plate positioned between the gear housing and the mounting head, the adaptor plate defining a plurality of slots for retaining therein the steering handle, the slots further adapted for securing therein a work tray when the handle is not engaged; and,
  a retaining pin extending through the mounting head collar and further extending through the drive shaft, the retaining pin maintaining the drive shaft in a secured position within the mounting head collar, the retaining pin further adapted for disengaging from the mounting, head collar and drive shaft, thereby allowing the mounting head collar to be removed from the drive shaft.

It is a further aspect of at least one embodiment of the present invention to provide a process of using an engine stand comprising:
  providing an engine stand having a wheeled base;
  a vertical upright attached to the wheeled base;
  a mounting head having a plurality of retainers, the mounting head and retainers adapted for attaching to an engine;
  the mounting head further defining a mounting head collar for receiving within the collar a drive shaft, the drive shaft and mounting head cantilevered outwardly over the wheeled base;
  a steering handle detachably supported by an adaptor plate, an adaptor plate positioned between the gear housing and the mounting head, the adaptor plate defining a plurality of slots for retaining therein the steering handle, the slots further adapted for securing therein a work tray when the handle is not engaged; and,
  a retaining pin extending through the mounting head collar and further extending through the drive shaft, the retaining pin maintaining the drive shaft in a secured position within the mounting head collar, the retaining pin further adapted for disengaging from the mounting head collar and drive shaft, thereby allowing the mounting head collar to be removed from the drive shaft;
  removing the steering handle from a storage location on the vertical upright;
  placing the steering handle on the adaptor plate, thereby allowing the user to engage the handle for moving the engine stand.

It is a further aspect of at least one embodiment of the present invention to provide a process wherein an engine is attached to the plurality of retainers.

It is a further aspect of at least one embodiment of the present invention to provide a process wherein the mounting head collar is disengaged and removed from the drive shaft.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Figure 1:
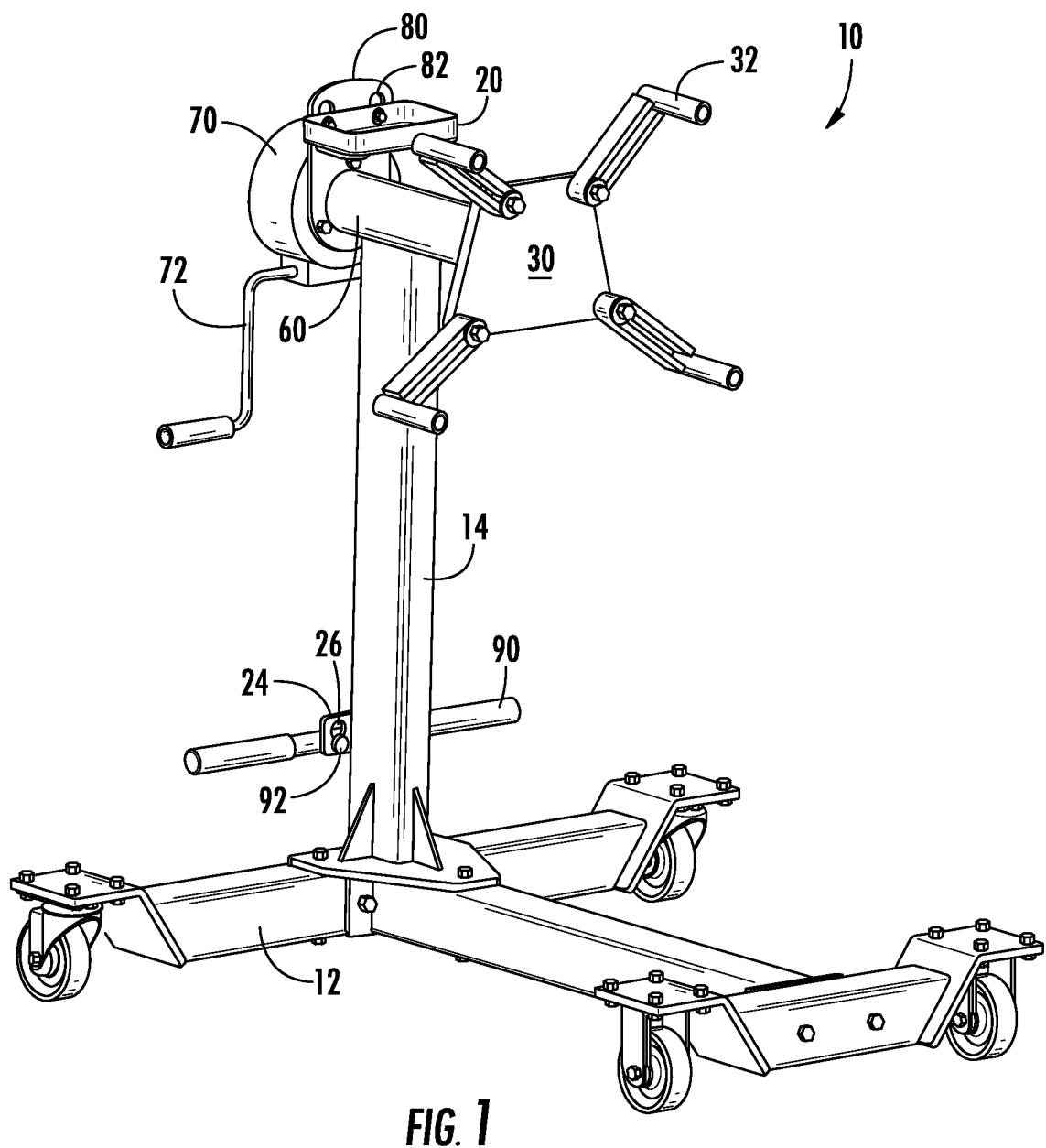
FIG. 1 is a perspective front view of a wheeled engine stand according to the present invention.
Figure 2:
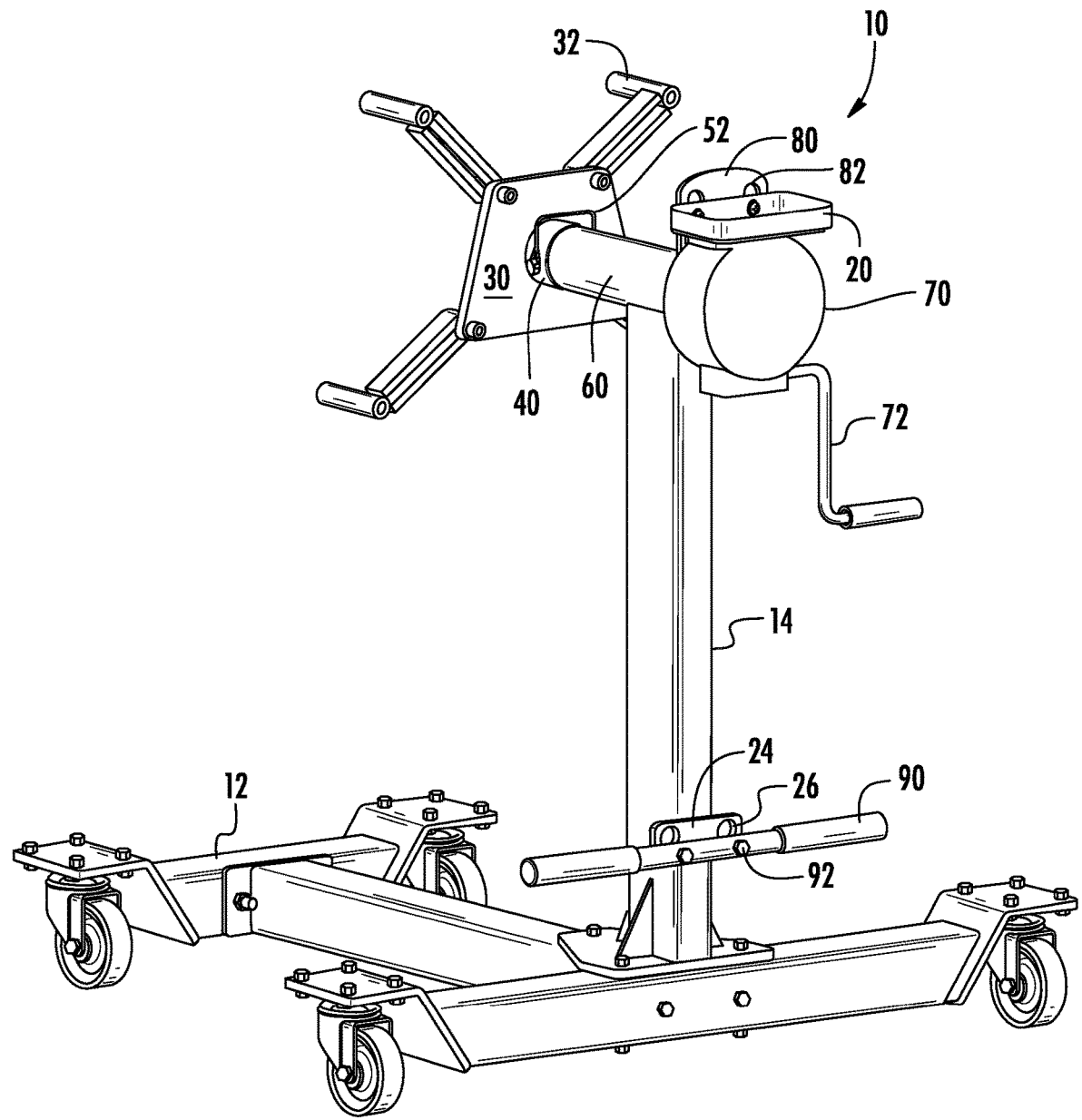
FIG. 2 is a rear perspective view of the engine stand seen in FIG. 1.
Figure 3:
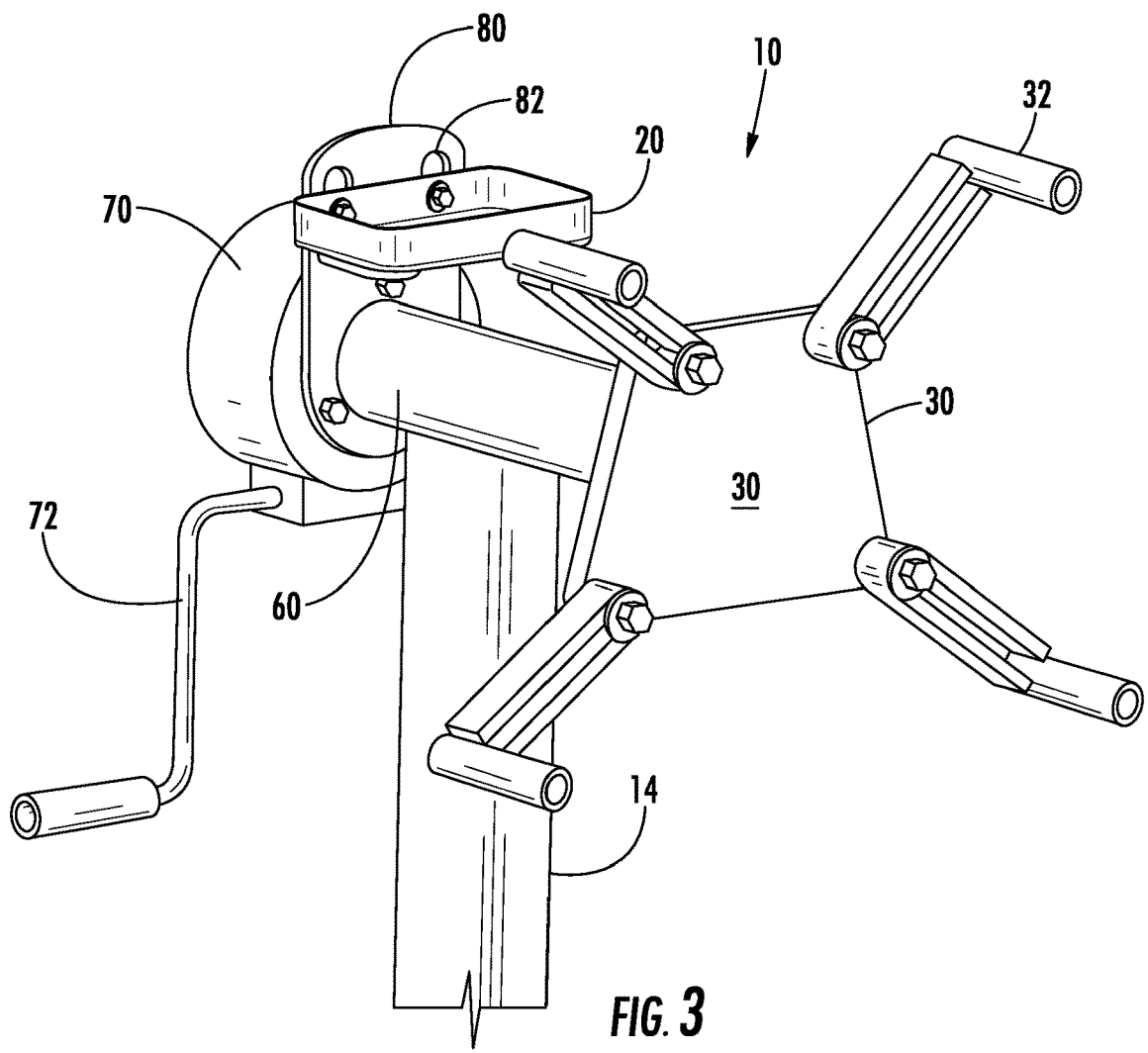
FIG. 3 is a close up perspective view of a gear housing and gear housing adapter plate as set forth in the present invention.
Figure 4:
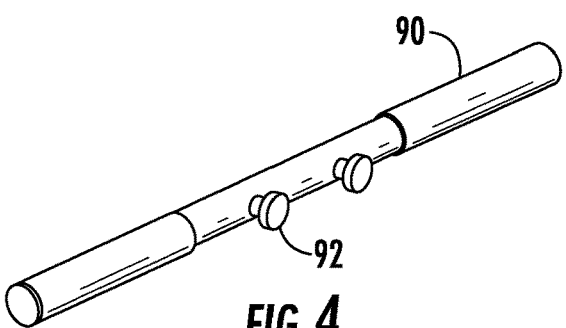
FIG. 4 is a perspective view of a handle that can be used and secured to the gear housing adapter plate.
Figure 5:
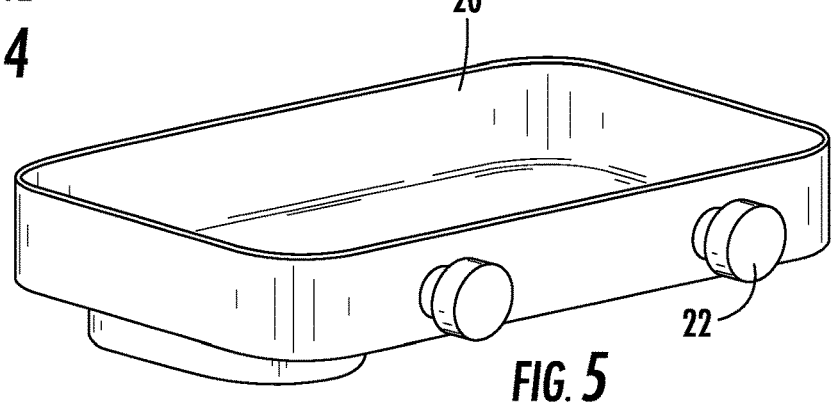
FIG. 5 is a tray which is adapted for engaging slots defined by the gear housing adaptor plate.

As seen in reference to FIGS. 1 and 2, an engine stand 10 is provided having a horizontal wheeled base 12 and a vertical upright 14. Attached to the vertical upright 14 is a detachable magnetic tray 20, magnetic tray 20 defining a plurality of pins 22 (FIG. 5) that are adapted for engaging a storage bracket 24 which defines a pair of correspondingly shaped slots 26.

Attached to the upper edge of the vertical upright 14 is a worm gear contained within a worm drive gear housing 70 and which is operationally engaged by a crank handle 72. A drive shaft 50 is contained within a drive shaft housing 60 and extends in a rearward direction to connect with a mounting head 30 having attached thereto right angled retainers 32. As best seen in reference to FIG. 6, the mounting head has defined on a receiving surface a mounting head collar 40 which is adapted to engage the drive shaft 50. A detent pin is used to provide a quick release connector that facilitates removing the mounting head collar 40 from the drive shaft 50 when detent pin 52 is disengaged.

Figure 6:
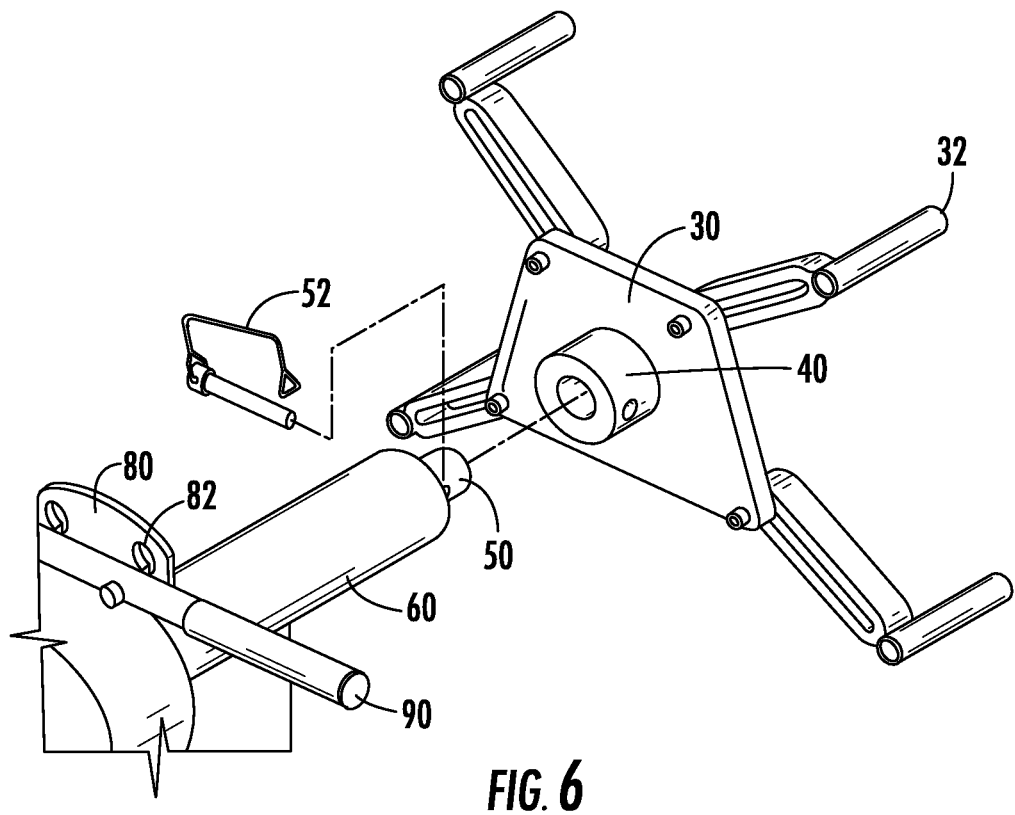
FIG. 6 is an exploded perspective view showing he relative position of a mounting head, mounting collar, drive shaft, and detent pin according to one aspect of the present invention.
Figure 7:
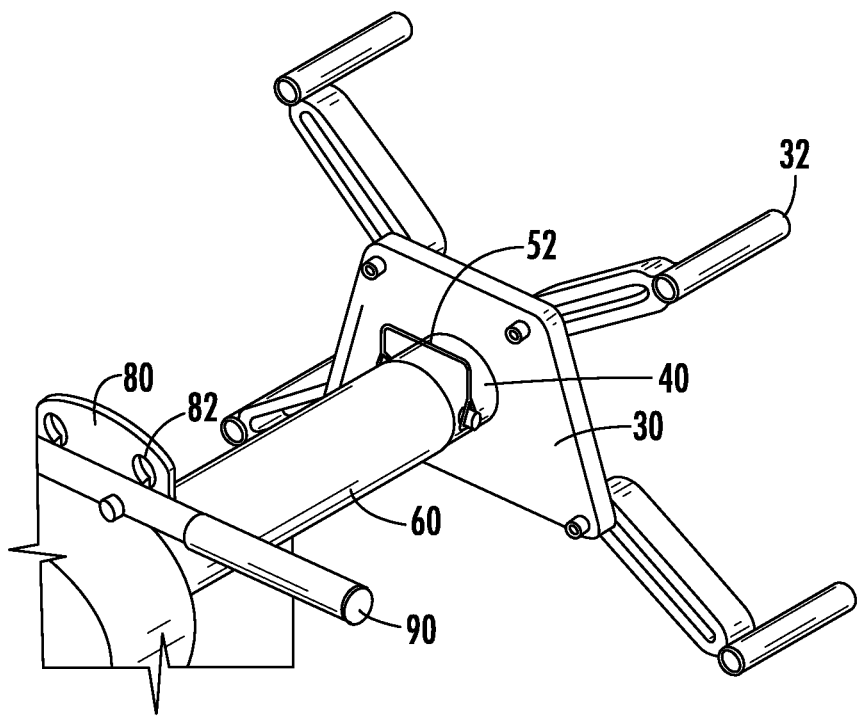
FIG. 7 is a perspective view, similar to FIG. 6, showing the components of the mounting head and drive shaft and assembled configuration.

As further seen in references to FIGS. 1 and 2, a steering handle 90 may reversibly engage the gear housing adaptor plate 80 via slots 82 which engage pins 92 defined by the steering handle 90 as seen in FIGS. 6 and 7. The steering handle 90 allows an operator to move and position the wheeled stand in accordance with ASME PASE Standards 2014 for the part 6 mobility requirement (6-2.6) and which is incorporated herein by reference. When, the steering handle 90 is removed, the slots 82 and the gear housing adaptor plate 80 can be used to engage a magnetic tray 20 through pins 22

The magnetic tray 20 can be the same tray which is maintained in a storage position as illustrated on FIGS. 1 and 2 or could be an additional separate tray which is adapted for similar engagement. Preferably, the tray has at least a portion of the work surface magnetized to facilitate the retention of engine parts within the tray. Tray 20 is positioned such that a bottom of the tray, when placed in bracket 80, is positioned above a height of the gear housing 70. Receiving slots 82 of bracket 80 are also positioned above the upper surface of the gear housing. In addition, a width of the tray 20 is less the width of the diameter of the gear housing 70. These dimensions prevent the tray 20 from interfering with the operation of the crank handle 72.

One feature of the present invention is that the removal nature of the steering handle allows for the easier operation of the crank handle without interference to either the handle or the operator engagement. Further, removal of the steering handle allows the mounting bracket to thereafter be used to secure a work tray using the same receiving slots 82. The magnetic tray 20 can extend in a first direction in such that the tray is positioned above the gear housing 70 or can be positioned on the opposite side of the gear housing adaptor plate such that the tray extends above the drive shaft housing 60. The tray 20 is designed to be easily and quickly removed. This allows the mounting head collar to be detached from the drive shaft 50 by disengagement of detent pin 52 that may facilitate the process of the operator removing the mounting head and installing the mounting head directly to the engine. Thereafter, the drive shaft can be positioned to reengage via the mounting head collar of the mounting head. This arrangement is preferred by some mechanics in that it is easier to engage an engine by securing the mounting head first when the mounting head is detached from the main body of the engine stand.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it should be, understood that aspects of the various embodiments may be interchanged, both in whole, or in part. Therefore, the spirit and scope of the invention should not be limited to the description of the preferred versions contained therein.

That is claimed:

1. An engine stand comprising:
  a wheeled base;
  a vertical upright attached to the wheeled base;
  a mounting head having a plurality of retainers, the mounting head and retainers adapted for attaching to an engine;
  the mounting head further defining a mounting head collar for receiving within the collar a drive shaft, the drive shaft and mounting head cantilevered outwardly over the wheeled base;
  a steering handle detachably supported by an adaptor plate, an adaptor plate positioned between a gear housing and the mounting head, the adaptor plate defining a plurality of slots for retaining therein the steering handle, the slots further adapted for securing therein a work tray when the handle is not engaged; and,
  a retaining pin extending through the mounting head collar and further extending through the drive shaft, the retaining pin maintaining the drive shaft in a secured position within the mounting head collar, the retaining pin further adapted for disengaging from the mounting head collar and drive shaft, thereby allowing the mounting head collar to be removed from the drive shaft.

2. The engine stand according to claim 1 wherein the vertical upright further supports a detachable tray secured by a plurality of pins extending from an edge of the tray to a corresponding plurality of slots defined within a bracket, the bracket secured to the vertical upright.

* * * * *